US011408644B2

(12) United States Patent
Hazzard et al.

(10) Patent No.: US 11,408,644 B2
(45) Date of Patent: Aug. 9, 2022

(54) CIRCUIT FOR DETECTING A LEAK IN A WATER HEATER DEVICE AND ACTIVATING AN ALARM DEVICE

(71) Applicant: Ademco Inc., Golden Valley, MN (US)

(72) Inventors: Frederick Hazzard, Plymouth, MN (US); Adam Myre, Minnetonka, MN (US); Gregory Young, Blaine, MN (US)

(73) Assignee: Ademco Inc., Golden Valley, MN (US)

(*) Notice: Subject to any disclaimer, the term of this patent is extended or adjusted under 35 U.S.C. 154(b) by 0 days.

(21) Appl. No.: 16/987,286

(22) Filed: Aug. 6, 2020

(65) Prior Publication Data

US 2021/0048224 A1 Feb. 18, 2021

Related U.S. Application Data

(60) Provisional application No. 62/886,796, filed on Aug. 14, 2019.

(51) Int. Cl.

*F24H 9/20* (2022.01)
*G01M 3/00* (2006.01)
*H04W 88/06* (2009.01)
*F22B 37/42* (2006.01)

(Continued)

(52) U.S. Cl.

CPC ......... *F24H 9/2035* (2013.01); *F22B 37/421* (2013.01); *G01M 3/00* (2013.01); *G08B 21/182* (2013.01); *H04W 88/06* (2013.01); *G08B 21/20* (2013.01); *Y10S 165/008* (2013.01)

(58) Field of Classification Search

CPC .... F23N 2231/02; F23N 2227/24; F24H 9/16; F24H 9/165; F24H 2240/08; F24H 9/2035; F22B 37/421; G21C 17/002; Y10S 165/008; G01M 3/00; G08B 21/182; G08B 21/20; H04W 88/06

See application file for complete search history.

(56) References Cited

U.S. PATENT DOCUMENTS 6,024,116 A * 2/2000 Almberg .............. F24H 9/2007 137/312
9,105,175 B1 * 8/2015 Cantolino ............. G08B 21/20
9,799,201 B2 10/2017 Hazzard et al.

(Continued)

FOREIGN PATENT DOCUMENTS

EP 2482000 A1 * 8/2012 .............. F24H 1/43

*Primary Examiner* — Edelmira Bosques
*Assistant Examiner* — Brett Peterson Mallon
(74) *Attorney, Agent, or Firm* — Shumaker & Sieffert, P.A.

(57) ABSTRACT

This disclosure is related to devices, systems, and techniques for outputting an alarm signal in response to detecting a leak in a water heater device. For example, a water heater device includes a leak sensor, an intermittent pilot light, and a circuit. The circuit includes processing circuitry configured to receive, from the leak sensor, an electrical signal including information indicative of a leak in the water heater device, activate, based on the electrical signal including information indicative of the leak, an alarm device, where the alarm device is powered for at least a period of time by a power source, where the power source is configured to receive energy from a thermoelectric device, and maintain an amount of energy stored by the power source so that the amount of energy is sufficient for the power source to supply energy to the alarm device.

16 Claims, 6 Drawing Sheets

(51) Int. Cl.

| | |
|---|---|
| ***G08B 21/18*** | (2006.01) |
| ***G08B 21/20*** | (2006.01) |

(56) References Cited

U.S. PATENT DOCUMENTS

| | | | | |
|---|---|---|---|---|
| 10,049,555 | B2 | 8/2018 | Hazzard et al. | |
| 10,692,351 | B2 | 6/2020 | Hazzard et al. | |
| 2009/0293819 | A1* | 12/2009 | Weiss | F22D 5/00<br>122/451 R |
| 2014/0199641 | A1* | 7/2014 | Chian | F23Q 7/26<br>431/6 |
| 2015/0276268 | A1* | 10/2015 | Hazzard | F23N 5/242<br>431/6 |
| 2018/0259133 | A1* | 9/2018 | Ravid | G01F 15/005 |
| 2018/0342146 | A1 | 11/2018 | Hazzard et al. | |

* cited by examiner

CIRCUIT FOR DETECTING A LEAK IN A WATER HEATER DEVICE AND ACTIVATING AN ALARM DEVICE

This application claims the benefit of U.S. Provisional Patent Application No. 62/886,796, filed on Aug. 14, 2019, the entire content of which is incorporated herein by reference.

TECHNICAL FIELD

The disclosure relates to water heating systems.

BACKGROUND

Tank-type water heating systems which incorporate gas combustion as a heat source typically utilize a pilot flame issuing from a pilot burner to initiate combustion of a main gas flow. Some systems have traditionally utilized a continuous pilot which remains lit during all operations, regardless of whether main burner operation is occurring.

SUMMARY

In general, the disclosure is directed to devices, systems, and techniques for using a water heater control system for activating an alarm in response to receiving information indicative of a leak in a water heater device. More specifically, the water heater control system may include an alarm device, one or more power sources, a leak sensor, a thermoelectric device, and an intermittent pilot light. The thermoelectric device may be in proximity to the intermittent pilot light such that the thermoelectric device is configured to convert heat energy from the intermittent pilot light into electrical energy. In turn, the thermoelectric device may supply the electrical energy to a power source of the one or more power sources in order to charge the power source. In response to the leak sensor detecting a leak in the water heater device, the alarm device may activate and draw energy from the power source.

In some examples, the water heater control system may ignite the intermittent pilot light if an amount of energy stored by the power source falls below a threshold amount of energy, thus allowing the thermoelectric device to generate electrical energy using the intermittent pilot light to charge the power source so that the alarm device may operate continuously as long as the leak sensor detects a leak. In some examples, the water heater control system may ignite the intermittent pilot light when the water heater control system senses the leak, and maintains the intermittent pilot light in a continuously ignited state as long as the intermittent pilot light senses the leak in order to ensure that the alarm device is supplied with enough energy to operate for as long as the leak sensor detects the leak. In some examples, the thermoelectric device supplies energy to the alarm device while the intermittent pilot light is ignited so that alarm device may operate continuously.

In some examples, a water heater device includes a leak sensor, an intermittent pilot light, and a circuit configured to sense one or more leaks in the water heater device. The circuit includes processing circuitry configured to receive, from the leak sensor, an electrical signal including information indicative of a leak in the water heater device. Additionally, the processing circuitry is configured to activate, based on the electrical signal including information indicative of the leak, an alarm device, where the alarm device is powered for at least a period of time by a power source having a limited amount of stored energy, where the power source is configured to receive energy from a thermoelectric device in proximity to the intermittent pilot light and maintain an amount of energy stored by the power source so that the amount of energy is sufficient for the power source to supply energy to the alarm device.

In some examples, a method indicates one or more leaks in a water heater device including a leak sensor, an intermittent pilot light, and a circuit, where the method includes receiving, with the circuit and from the leak sensor, an electrical signal including information indicative of a leak in the water heater device and activating, with the circuit and based on the electrical signal including information indicative of the leak, an alarm device, where the alarm device is powered for at least a period of time by a power source having a limited amount of stored energy, where the power source is configured to receive energy from a thermoelectric device in proximity to the intermittent pilot light. Additionally, the method includes maintaining an amount of energy stored by the power source so that the amount of energy is sufficient for the power source to supply energy to the alarm device.

In some examples, a water heater device includes a leak sensor, an intermittent pilot light, and a circuit configured to sense one or more leaks in the water heater device. The circuit includes an alarm device, a power source, a thermoelectric device in proximity to the intermittent pilot light, and processing circuitry. The processing circuitry is configured to receive, from the leak sensor, an electrical signal including information indicative of a leak in the water heater device and activate, based on the electrical signal including information indicative of the leak, the alarm device, where the alarm device is powered for at least a period of time by the power source having a limited amount of stored energy, where the power source is configured to receive energy from the thermoelectric device. Additionally, the processing circuitry is configured to maintain an amount of energy stored by the power source so that the amount of energy is sufficient for the power source to supply energy to the alarm device.

In some examples, a water heater device includes a leak sensor, a standing pilot light, and a circuit configured to sense one or more leaks in the water heater device. The circuit includes an alarm device, a thermoelectric device in proximity to the intermittent pilot light, and processing circuitry configured to receive, from the leak sensor, an electrical signal including information indicative of a leak in the water heater device and activate, based on the electrical signal including information indicative of the leak, the alarm device, where the alarm device is powered for at least a period of time by the thermoelectric device.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
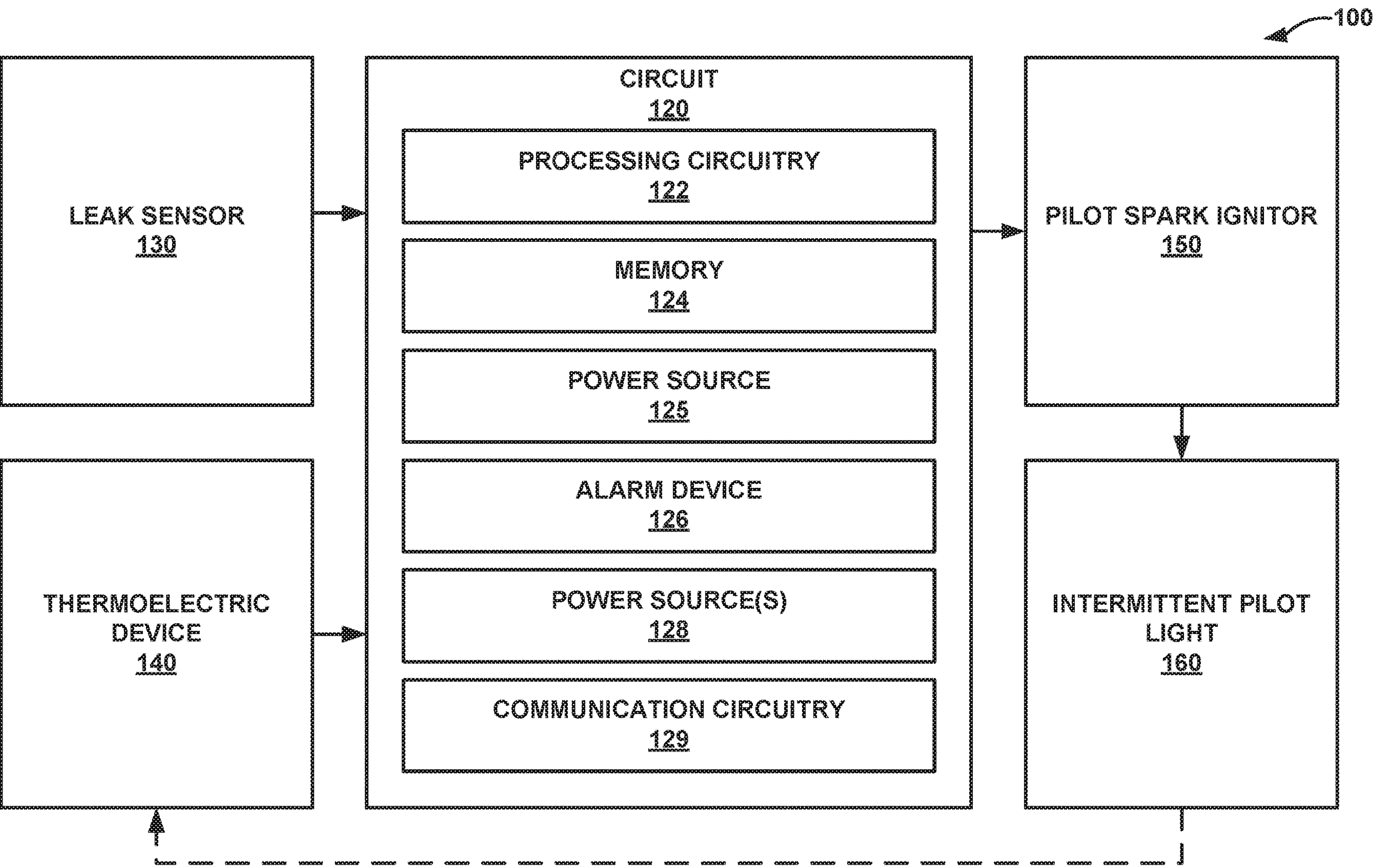
FIG. 1 is a block diagram illustrating a water heater control system, in accordance with one or more techniques of this disclosure.

This disclosure describes devices, systems, and techniques for using a water heater control system to sense a leak in a water heater device and activate an alarm device in response to sensing the leak. In some examples, the water heater control system allows the alarm device to remain in a continuously activated state (e.g., emitting a noise or outputting another alarm signal) for as long as necessary by supplying the alarm device with power from a power source that is charged using energy from a thermoelectric device in proximity to an intermittent pilot light. Additionally, or alternatively, the energy from the thermoelectric device may directly supply power to the alarm device. In this way, the water heater control system may output an alarm signal until the water heater control system receives information indicating that the alarm is resolved (e.g., a message to ignore the leak or a message that the leak is addressed).

The leak sensor may output an electrical signal in response to sensing a leak in the water heater device. Processing circuitry of the water heater control system may receive the electrical signal identifying the leak in the water heater device and activate the alarm device, causing the alarm device to emit an alarm signal which may travel a distance from the water heater device. In some cases, the alarm device includes a speaker and the alarm signal includes an audio signal emitted by the speaker. Additionally, or alternatively, the alarm signal includes optical signals (e.g., an alarm light), electromagnetic signals (e.g., a radio signal), mechanical signals, or any combination thereof. The alarm device may draw an electrical current from a power source which stores a limited amount of energy. As such, if the alarm device is activated for a period of time, the alarm device may deplete the energy stored by the power source unless the power source is recharged. One or more techniques described herein may allow the water heater control system to recharge the power source in order to supply energy to the alarm device as needed. Additionally, one or more techniques described herein may allow the thermoelectric device to directly supply energy to the alarm device as needed.

In some examples, the processing circuitry may monitor an amount of energy stored by the power source. If the amount of energy stored by the power source falls below a threshold amount of energy, the processing circuitry may ignite the intermittent pilot light if the intermittent pilot light is not ignited. In turn, the thermoelectric device may generate electrical energy from heat radiated by the intermittent pilot light and output the electrical energy to the power source. The electrical energy generated by the thermoelectric device may charge the power source. In some examples, the processing circuitry may maintain the intermittent pilot light in a continuously ignited state at least until the amount of energy stored by the power source rises above the threshold amount of energy. In some examples, the processing circuitry may maintain the intermittent pilot light in a continuously ignited state at least until the amount of energy stored by the power source substantially reaches a maximum amount of energy that the power source is configured to store or a fraction of the maximum amount of energy that the power source is configured to store. As such, by monitoring the amount of energy stored by the power source and controlling the intermittent pilot light to provide energy for charging the power source, the processing circuitry may ensure that the amount of energy stored by the power source is maintained at a sufficient level to operate the alarm device for an extended period of time. In some examples, the processing circuitry may maintain the intermittent pilot light indefinitely.

In the above example, the processing circuitry ignites the intermittent pilot to cause the thermoelectric device to output energy to a power source. However, in some examples, the thermoelectric device may directly power the alarm device.

In some examples, the processing circuitry may ignite the intermittent pilot light in response to receiving the electrical signal indicating that the leak sensor detects a leak in the water heater device. The thermoelectric device may generate electrical energy using heat emitted by the intermittent pilot light and supply the electrical energy to the power source in order to charge the power source or directly to the alarm device. In some cases, the processing circuitry may maintain the intermittent pilot light in an ignited state for as long as the processing circuitry receives the electrical signal indicating that the leak sensor detects a leak. In some cases, the processing circuitry may maintain the intermittent pilot light in an ignited state at least until the amount of energy stored by the power source substantially reaches a maximum amount of energy that the power source is configured to store.

The water heater control system may include communication circuitry that is configured to communicate with one or more other devices (e.g., remote devices including smart phones, tablets, servers, or any combination thereof). For example, the processing circuitry may output, via the communication circuitry, information indicating that a leak is detected in the water heater device. In this way, the processing circuitry may allow the water heater control system to spread news of the detected leak past a range of the alarm device (e.g., past a sound radius and/or a sight radius of the alarm device). Additionally, the communication circuitry may receive information from the one or more other devices including an instruction to ignore the detected leak, a message that the leak has been repaired, a request for data stored by the water heater control system, or other information. In this way, the communication circuitry may allow remote access and control of the water heater control system in real time, which may be beneficial for timely management and repair of detected leaks.

FIG. 1 is a block diagram illustrating a water heater control system 100, in accordance with one or more techniques of this disclosure. As seen in FIG. 1, water heater control system 100 includes circuit 120, leak sensor 130, thermoelectric device 140, pilot spark ignitor 150, and intermittent pilot light 160. Circuit 120 includes processing circuitry 122, memory 124, power source 125, alarm device 126, power source(s) 128, and communication circuitry 129. Water heater tanks may be susceptible to failures (e.g., leaks, ruptures, and breaches). In some cases, it may be beneficial to detect such failures so that the failures may be repaired or otherwise addressed in a timely manner. Circuit 120 may be configured to sense a leak in a water heater device (not illustrated in FIG. 1) and output one or more alarm signals in response to sensing the leak.

Processing circuitry 122, in some examples, may include one or more processors that are configured to implement functionality and/or process instructions for execution within water heater control system 100. For example, processing circuitry 122 may be capable of processing instructions stored in a memory (e.g., memory 124). Processing circuitry 122 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 122 may include any suitable structure, whether in hardware, software, firmware, or any combination thereof, to perform the functions ascribed herein to processing circuitry 122.

Memory 124 may be configured to store information within water heater control system 100 during operation. Memory 124 may include a computer-readable storage medium or computer-readable storage device. In some examples, memory 124 includes one or more of a short-term memory or a long-term memory. Memory 124 may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EEPROM). In some examples, memory 124 is used to store program instructions for execution by processing circuitry 122. Memory 124 may be used by software or applications running on water heater control system 100 to temporarily store information during program execution.

Power source 125 is configured to deliver operating power to one or more components of water heater control system 100. In some examples, power source 125 may deliver operating power to processing circuitry 122. In some examples, power source 125 includes a battery and a power generation circuit to produce operating power. Power source 125 may include any one or more of a plurality of different battery types, such as nickel cadmium batteries and lithium ion batteries. Additionally, or alternatively, power source 125 may include one or more capacitors configured to store energy.

In some examples, alarm device 126 is controlled by processing circuitry 122 to output one or more alarm signals. In some examples, alarm device 126 includes one or more speakers configured to emit audio signals (e.g., noise). For example, alarm device 126 may include mid-range drivers, full range drivers, subwoofers, woofers, tweeters, coaxial drivers, horn loudspeakers, or any combination thereof. In some examples, alarm device 126 may emit a continuous noise. In some examples, alarm device 126 may emit audio signals in a pattern or repeating envelope. In some examples, the audio signals emitted by alarm device 126 may be within a range from 80 decibels (dB) to 120 dB. Additionally, or alternatively, alarm device 126 may include one or more optical components (e.g., light-emitting diodes (LEDs), fluorescent lights, and incandescent lights) and electromagnetic units (e.g., radios).

Power source(s) 128 is configured to deliver operating power to one or more components of water heater control system 100. For example, power source(s) 128 may deliver operating power to alarm device 126, ignition circuitry (not illustrated in FIG. 1) which controls pilot spark ignitor 150, a pilot valve operator (not illustrated in FIG. 1) which actuates a gas valve of intermittent pilot light 160, or any combination thereof. In some examples, power source(s) 128 includes a battery and a power generation circuit to produce operating power. In some examples, the battery is rechargeable to allow extended operation. Power source(s) 128 may include any one or more of a plurality of different battery types, such as nickel cadmium batteries and lithium ion batteries. Additionally, or alternatively, power source(s) 128 may include one or more capacitors configured to store energy. In some examples, processing circuitry 122 may activate a switching device (not illustrated in FIG. 1) which allows power source 125 to supply energy to power source(s) 128, charging power source(s) 128. Additionally, processing circuitry 122 may deactivate the switching device, preventing power source 125 from supplying energy to power source(s) 128.

Communication circuitry 129 may include any suitable hardware, firmware, software or any combination thereof for communicating with another device. Under the control of processing circuitry 122, communication circuitry 129 may receive downlink telemetry from, as well as send uplink telemetry to, one or more other devices. In addition, processing circuitry 122 may communicate with a networked computing device and a computer network. Communication circuitry 129 may include any combination of a Bluetooth® radio, Wi-Fi® circuitry, an electronic oscillator, frequency modulation circuitry, frequency demodulation circuitry, amplifier circuitry, and power switches such as a metal-oxide-semiconductor field-effect transistors (MOSFET), a bipolar junction transistor (BJT), an insulated-gate bipolar transistor (IGBT), a junction field effect transistor (JFET), or another element that uses voltage or current for its control.

In some examples, processing circuitry 122 receives, from leak sensor 130, an electrical signal including information indicative of a leak in a water heater device (not illustrated in FIG. 1). Leak sensor 130 may, in some cases, include two or more conductive elements that are configured to generate an electrical signal in response to sensing a leak in the water heater device. For example, if moisture accumulates on the conductive elements of leak sensor 130, a magnitude of a parameter (e.g., current magnitude or voltage magnitude) of the electrical signal produced by leak sensor 130 may change (e.g., increase or decrease) from a first parameter value to a second parameter value. Processing circuitry 122 may be configured to detect such a change in the electrical signal generated by leak sensor 130 and determine, based on the change in the electrical signal (e.g., a change in electrical current), that a leak is occurring in the water heater device. In some examples, processing circuitry 122 may determine that a leak is present in the water heater device for as long as the parameter of the electrical signal generated by leak sensor 130 deviates from the first parameter value by at least a threshold parameter value.

Processing circuitry 122 may activate alarm device 126 in response to receiving the electrical signal from leak sensor 130 including information indicative of the leak. In some examples, processing circuitry 122 may maintain alarm device 126 in a continuously activated state during a period of time in which processing circuitry 122 receives the electrical signal including information indicative of a leak in the water heater device. In some examples, processing circuitry 122 may intermittently activate alarm device 126 on a continuous basis during a period of time in which processing circuitry 122 receives the electrical signal including information indicative of a leak in the water heater device. For example, processing circuitry 122 may activate alarm device 126 according to a sequence of on/off cycles, where alarm device 126 alternates between an 'on' phase and an 'off' phase. Alarm device 126 may be powered by power source(s) 128 which stores a limited amount of stored energy. In this way, alarm device 126 may deplete the energy stored by power source(s) 128 if alarm device 126 continuously draws energy from power source(s) 128 without power source(s) 128 being charged. Power source(s) 128 is configured to receive energy from thermoelectric device 140. For example, thermoelectric device 140 may be in proximity to intermittent pilot light 160. Thermoelectric device 140 may generate electrical energy using heat energy emitted by intermittent pilot light 160 while intermittent pilot light 160 is in an ignited state. As such, it may be beneficial for processing circuitry 122 to ignite intermittent pilot light 160 in order to replenish energy used by alarm device 126 while alarm device 126 is activated. For example, processing circuitry 122 may maintain an amount of energy stored by power source(s) 128 using energy generated by thermopile 140 so that the amount of energy stored by power source(s) 128 is sufficient for power source(s) 128 to supply energy to alarm device 126.

In some examples, processing circuitry 122 may intermittently activate alarm device 126 according to a duty cycle and a frequency by controlling a switching device which controls power flowing through alarm device 126. As used herein, the term "duty cycle" refers to a ratio of an amount of time that alarm device 126 is turned on (e.g., emitting noise) to an amount of time that alarm device 126 is turned off (e.g., not emitting noise) and the term "frequency" refers to a number of on/off cycles completed per unit of time. As an example, when processing circuitry 122 controls alarm device 126 to cycle between being turned on and being turned off at a frequency of 5 (Hz) and at a duty cycle of 0.5, the alarm device 126 may perform 5 on/off cycles per second, where an on phase of the alarm device 126 lasts as long as an off phase of alarm device 126.

In some examples, processing circuitry 122 may set the duty cycle and/or the frequency of the alarm device 126 so that the alarm device 126 does not draw power at a greater rate than a rate in which thermoelectric device 140 supplies power to circuit 120. For example, by decreasing a duty cycle and/or decreasing a frequency of alarm device 126, processing circuitry 122 may decrease a rate in which alarm device 126 draws power. Alternatively, by increasing a duty cycle and/or increasing a frequency of alarm device 126, processing circuitry 122 may increase a rate in which alarm device 126 draws power. In any case, processing circuitry 122 may prevent alarm device 126 from drawing power faster than thermoelectric device 140 supplies power to circuit 120.

Thermoelectric device 140 is an electrical circuit component that is configured to convert thermal energy into electrical energy (e.g., a thermopile). In some examples, thermoelectric device 140 generates an output voltage that is proportional to a local temperature difference or temperature gradient.

In some examples, to maintain the amount of energy stored by power source(s) 128, processing circuitry 122 is configured to monitor an amount of energy stored by power source(s) 128 to determine if the amount of energy stored by power source(s) 128 is greater than a threshold amount of energy and supply power to power source(s) 128 in response to power source(s) 128 falling below the threshold amount of energy. For example, processing circuitry 122 may measure a power capacity of power source(s) 128, where the power capacity represents a measure of electrical energy equivalent to a power consumption per hour. In some examples, based on the amount of energy stored by power source(s) 128 falling below the threshold amount of energy, processing circuitry 122 may ignite intermittent pilot light 160. In some examples, to ignite intermittent pilot light 160, processing circuitry 122 may output an electrical signal to ignition circuitry (not illustrated in FIG. 1) in order to cause pilot spark ignitor 150 to emit one or more sparks which ignite intermittent pilot light 160. Subsequently, processing circuitry 122 may allow thermoelectric device 140 to receive energy from power source(s) 128, thus increasing the amount of energy stored by power source(s) 128. For example, processing circuitry 122 may activate a switching device (not illustrated in FIG. 1) which allows a current to flow from thermoelectric device 140 through power source(s) 128.

Processing circuitry 122, in some cases, may maintain intermittent pilot light 160 in a continuously ignited state at least until the amount of energy stored by power source(s) 128 rises above the threshold amount of energy. In some examples, processing circuitry 122 may maintain intermittent pilot light 160 in the continuously ignited state until the amount of energy stored by power source(s) 128 rises above the threshold amount of energy. In some examples, processing circuitry 122 may maintain intermittent pilot light 160 in the continuously ignited state until the amount of energy stored by power source(s) 128 rises above the threshold amount of energy by a predetermined amount of energy. In some examples, processing circuitry 122 may maintain intermittent pilot light 160 in the continuously ignited state until power source(s) 128 substantially reaches a maximum power capacity. In one or more examples described herein, processing circuitry 122 may cause intermittent pilot light 160 to extinguish or allow intermittent pilot light 160 to extinguish after the amount of energy stored by power source(s) 128 reaches a satisfactory level.

In some examples, thermoelectric device 140 may directly supply power to alarm device 126 without power source(s) 128 supplying power to alarm device 126. In some cases, thermoelectric device 140 may supply power to alarm device 126 for a period of time while thermoelectric device 140 is supplying energy to charge power source(s) 128. For example, processing circuitry 122 may activate a switching device (not illustrated in FIG. 1) in order to allow a current to pass through alarm device 126 from thermoelectric device 140 and processing circuitry 122 may activate another switching device (not illustrated in FIG. 1) in order to allow a current to pass through power source(s) 128 in order to charge power source(s) 128. In some cases, processing circuitry 122 may supply power to alarm device 126 for a period of time while thermoelectric device is not supplying energy to charge power source(s) 128. For example, while power source(s) 128 is substantially charged to a maximum amount of power and intermittent pilot light 160 is in an ignited state, thermoelectric device 140 may directly supply power to alarm device 126 while power source(s) 128 is not supplying power to alarm device 126. In some cases, thermoelectric device 140 and power source(s) 128 may both supply power alarm device 126 for a period of time.

In some cases, processing circuitry 122 may ignite intermittent pilot light 160 in response to receiving the electrical signal including information indicative of a leak in the water heater device. In this way, processing circuitry 122 may ignite the intermittent pilot light 160 to ensure that thermoelectric device 140 will supply enough energy to power source(s) 128 such that circuit 120 may maintain alarm device 126 in a continuously activated state. Processing circuitry 122 may allow thermoelectric device 140 to supply energy to power source(s) 128, thus increasing the amount of energy stored by power source(s) 128. For example, processing circuitry 122 may activate a switching device (not illustrated in FIG. 1) which causes a current to flow from thermoelectric device 140 through power source(s) 128, recharging power source(s) 128. In some cases, while thermoelectric device 140 supplies energy to power source(s) 128 and processing circuitry 122 receives the electrical signal including information indicative of a leak in the water heater device, thermopile 140 directly supplies energy to alarm device 126 in order to maintain alarm device 126 in a continuously activated state.

Processing circuitry 122 may maintain intermittent pilot light 160 in a continuously ignited state during a period of time in which processing circuitry 122 receives the electrical signal including information indicative of a leak in the water heater device. In some cases, processing circuitry 122 may maintain intermittent pilot light 160 in a continuously ignited state for as long as leak sensor 130 provides indication that the leak is present in the water heater device. In some cases, processing circuitry 122 may maintain intermittent pilot light 160 in the continuously ignited state until the amount of energy stored by power source(s) 128 reaches a predetermined amount of energy. In some cases, processing circuitry 122 may maintain intermittent pilot light 160 in the continuously ignited state until power source(s) 128 substantially reaches a maximum power capacity. In one or more examples described herein, processing circuitry 122 may cause intermittent pilot light 160 to extinguish or allow intermittent pilot light 160 to extinguish after the amount of energy stored by power source(s) 128 reaches a satisfactory level.

In some examples, processing circuitry 122 is configured to output a message in response to receiving information from leak sensor 130 that a leak is present in the water heater device. For example, processing circuitry 122 is configured to output, via communication circuitry 129, the message including the information indicative of the leak in the water heater device to one or more remote devices. In some examples, processing circuitry 122 includes a Bluetooth® radio and communication circuitry 129 is configured to communicate according to one or more Bluetooth® communication protocols. In some examples, processing circuitry 122 includes Wi-Fi® circuitry and communication circuitry 129 is configured to communicate according to one or more Wi-Fi® communication protocols. In some examples, communication circuitry 129 is configured to communicate according to one or more other communication protocols.

Processing circuitry 122 may receive, via communication circuitry 129, a message including an instruction to ignore the information indicative of a leak in the water heater device (e.g., a message that the leak has been repaired, a message to ignore the leak in response to the leak detection being a false alarm, or a message to ignore the leak for other reasons). Subsequently, in some cases, processing circuitry 122 may deactivate alarm device 126 in response to receiving the message including the instruction to ignore the information indicative of a leak in the water heater device. Processing circuitry 122 may maintain the alarm device in a continuously deactivated state for at least a predetermined amount of time. In other words, if processing circuitry 122 receives an indication of a leak from leak sensor 130 during the predetermined amount of time that alarm device 126 is in the continuously deactivated state, processing circuitry 122 may decline to activate alarm device 126.

In some examples, processing circuitry 122 is configured to control a main burner to maintain a temperature of water in a water tank at a predetermined temperature value. The water tank may be a part of the water heater device. For example, processing circuitry 122 may be configured to ignite, based on a water temperature model stored by memory 124, intermittent pilot light 160 in order to toggle the main burner between an activated state and a deactivated state. As such, processing circuitry 122 may, in some cases, both regulate the temperature of the water in the water heater device and operate water heater control system 100.

One or more techniques of this disclosure include a water heater control system 100 for a water heater device including an intermittent pilot light (e.g., intermittent pilot light 160). Intermittent pilot light 160 may be ignited when needed. For example, intermittent pilot light 160 may be ignited in order to ignite a main burner which heats water in a tank of a water heater device. Additionally, or alternatively, intermittent pilot light 160 may be ignited in order to recharge power source(s) 128 such that power source(s) 128 may maintain alarm device 126 in a continuously activated state. For example, water heater control system 100 allows for a continuous alarm for an intermittent pilot water heater device. This disclosure is conducive to use with a “connected” water heater controller (e.g., processing circuitry 122). For example, a connected water heater controller including processing circuitry 122 may be connected to the external environment through Bluetooth®, Wi-Fi®, or some other communication protocol. Processing circuitry 122 may notify an end user that a leak has been detected in the water heater device.

Some leak sensors are battery powered and do not receive any energy from a water heater controller. Water heater control system 100, on the other hand, may include a way to store energy on circuit 120 in a battery or supercapacitor (e.g., power source(s) 128) in order to operate leak sensor 130 and alarm device 126. Energy from power source(s) 128 may come from thermoelectric device 140. To activate alarm device 126 continuously, or to activate alarm device 126 continuously in an intermittent mode without running out of power, excess thermoelectric device energy that is available when intermittent pilot light 160 is ignited may be used to operate alarm device 126. In some examples, alarm device 126 may also operate while the main burner of the water heater device is activated if sufficient energy is stored by power source(s) 128. In some examples, processing circuitry 122 may ensure that the main burner is not in an ignited state once a leak has been detected. Leak sensor 130 may draw energy from thermoelectric device 140 at a rate slow enough to prevent a thermoelectric device fault error from being detected by processing circuitry 122. Processing circuitry 122 may control the energy draw rate to maintain operation of alarm device 126 indefinitely.

Some water heater leak sensors may have a battery or supercapacitor to operate and sound an alarm if a leak is detected, making the water heater leak sensor a stand-alone device. In practice, a battery may be used instead of a supercapacitor because the battery is easily replaced. As the battery runs lower in available charge over time, the length of time the alarm can sound becomes less and less and eventually reaches zero and the leak sensor stops functioning. In order to overcome this limitation, water heater control system 100 may operate leak sensor 130 and alarm device 126 directly off an intermittent pilot rechargeable power supply (e.g., power source(s) 128). It may be desirable to include circuit 120 on an intermittent pilot control board and have the leak sensor 130 be an external component. In some examples, in the event that a leak is detected, the processing circuitry 122 may ignite intermittent pilot light 160 and leave it running continuously as long as the leak condition was detected or until a command was received to ignore the leak. Lighting intermittent pilot light 160 in this manner may generate power to allow alarm device 126 to sound as long as necessary.

Processing circuitry 122 may include a power and signal connection for circuit 120 if circuit 120 is made as an external system or may have the power and signal connections internal if circuit 120 is integrated onto the control board. This may allow processing circuitry 122 to be notified if a leak is detected. Then, if processing circuitry 122 is connected to the external environment through Bluetooth®, Wi-Fi®, or some other communication protocol, processing circuitry 122 may notify an end user that a leak has been detected in the water heater device. Drawing power directly from the intermittent pilot's rechargeable power supply (e.g., power source(s) 128) may improve a reliability, eliminate a need to replace batteries, simplify a design, reduce a cost, and increase a functionality of water heater control system 100.

Although system 100 of FIG. 1 is described as including an intermittent pilot light 160, this is not required. In some examples, a system may include a standing pilot light (e.g., a pilot light which is continuously ignited) which causes a thermoelectric device to supply power to a circuit. The system may include a leak sensor which supplies a leak sensor signal to the circuit, and processing circuitry of the circuit may activate an alarm device responsive to identifying a leak in a water heater tank based on the leak sensor signal. Responsive to identifying the leak, the processing circuitry may prevent a main burner of the water heater from being ignited, and the processing circuitry may direct power generated by the thermoelectric device to power the alarm device.

Figure 2:
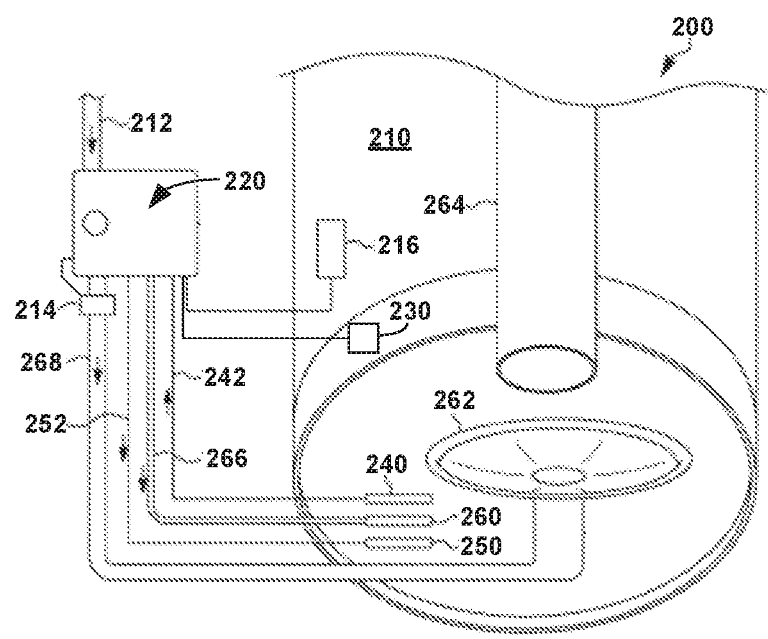
FIG. 2 provides an example water heating system including an intermittent pilot tight and a main burner, in accordance with one or more techniques of this disclosure.

FIG. 2 provides an example water heating system 200 including intermittent pilot light 260 and main burner 262, in accordance with one or more techniques of this disclosure. As seen in FIG. 2, water heating system 200 includes water tank 210, fuel line 212, main valve 214, temperature sensing device 216, control system 220, leak sensor 230, thermoelectric device 240, electrical line 242, pilot spark ignitor 250, electrical line 252, intermittent pilot light 260, main burner 262, flue 264, fuel line 266, and fuel line 268. Leak sensor 230 may be an example of leak sensor 130 of FIG. 1. Thermoelectric device 240 may be an example of thermoelectric device 140 of FIG. 1. Pilot spark ignitor 250 may be an example of pilot spark ignitor 150 of FIG. 1. Intermittent pilot light 260 may be an example of intermittent pilot light 160 of FIG. 1. Water heating system 200 may be configured to perform one or more techniques described with respect to water heater control system 100 of FIG. 1.

Fuel line 212 may be in fluid communication with main valve 214, which controls fuel flow to a main burner 262. Flue 264 may be an exhaust for main burner 262 in system 200. A pilot valve (not illustrated in FIG. 2) may control fuel flow to an intermittent pilot light 260 through fuel line 266. The pilot valve may be substantially in parallel, substantially in series, or in some other arrangement with main valve 214, and fuel to intermittent pilot light 260 may conic from fuel line 212 or some other source. There may be a pilot spark ignitor 250 for igniting a pilot gas flow discharging from intermittent pilot light 260.

There may be a thermoelectric device 240 connected by an electrical line 242 to control system 220. There may be a pilot spark ignitor 250 for igniting a pilot gas flow discharging from intermittent pilot light 260. Pilot spark ignitor 250 may be connected via electrical line 252 to control system 220. Thermoelectric device 240 may be in thermal communication with pilot flame generated at intermittent pilot light 260 and may convert some portion of a heat flux emitted by the pilot flame into electrical energy. A temperature sensing device 216 may be connected to control system 220 and situated in a water tank 210, or otherwise be configured to be in thermal communication with a volume of water in water tank 210. Control system 220 may incorporate a microcontroller configured to establish electrical or data communication with one or more of main valve 214, the pilot valve, and other components.

Control system 220 may include a pilot valve operator configured to actuate the pilot valve of system 200 and may include a main valve operator configured to actuate main valve 214. Control system 220 may also establish an electrical connection between thermoelectric device 240 and the main valve operator, such that the main valve operator can be powered by thermoelectric device 240. Control system 220 may also include an energy storage system in electrical connection with the pilot valve operator.

In an intermittent pilot light system, when fuel line 268 operation is called for, an operating sequence in system 200 might initially actuate the pilot valve and establish a pilot flame at intermittent pilot light 260 prior to commencing main valve 214 operations. For example, control system 220 might initially actuate the pilot valve and pilot spark ignitor 250 using an energy storage system in order to establish the pilot flame at intermittent pilot light 260. Subsequently, once the pilot flame is established, the operating sequence might actuate main valve 214 using power delivered by thermoelectric device 240. In this manner, main fuel flow to fuel line 268 may be established and the pilot flame may generate combustion of the main fuel flow. A sequence ensuring that the pilot flame is established prior to initiating main fuel flow to the burner avoids situations leading to discharges of non-combusted main fuel into surrounding environments.

System 200 may include one or more components of water heater control system 100 of FIG. 1. For example, system 200 includes leak sensor 230, which may output a leak signal in response to detecting a leak in water tank 210. Leak sensor 230 may be located at a base of water tank 210. Since moisture may accumulate at the base of water tank 210 when a leak is present in water tank 210, leak sensor 230 may be located such that leak sensor 230 may detect the moisture that is indicative of the leak in water tank 210. In response to receiving a leak signal from leak sensor 230, processing circuitry of control system 220 may be configured to activate an alarm device (not illustrated in FIG. 2), which draws power from a power source (not illustrated in FIG. 1) of control system 220. The processing circuitry of control system 220 may be configured to maintain the amount of energy stored by the power source so that the amount of energy is sufficient for the power source to supply energy to the alarm device.

Figure 3:
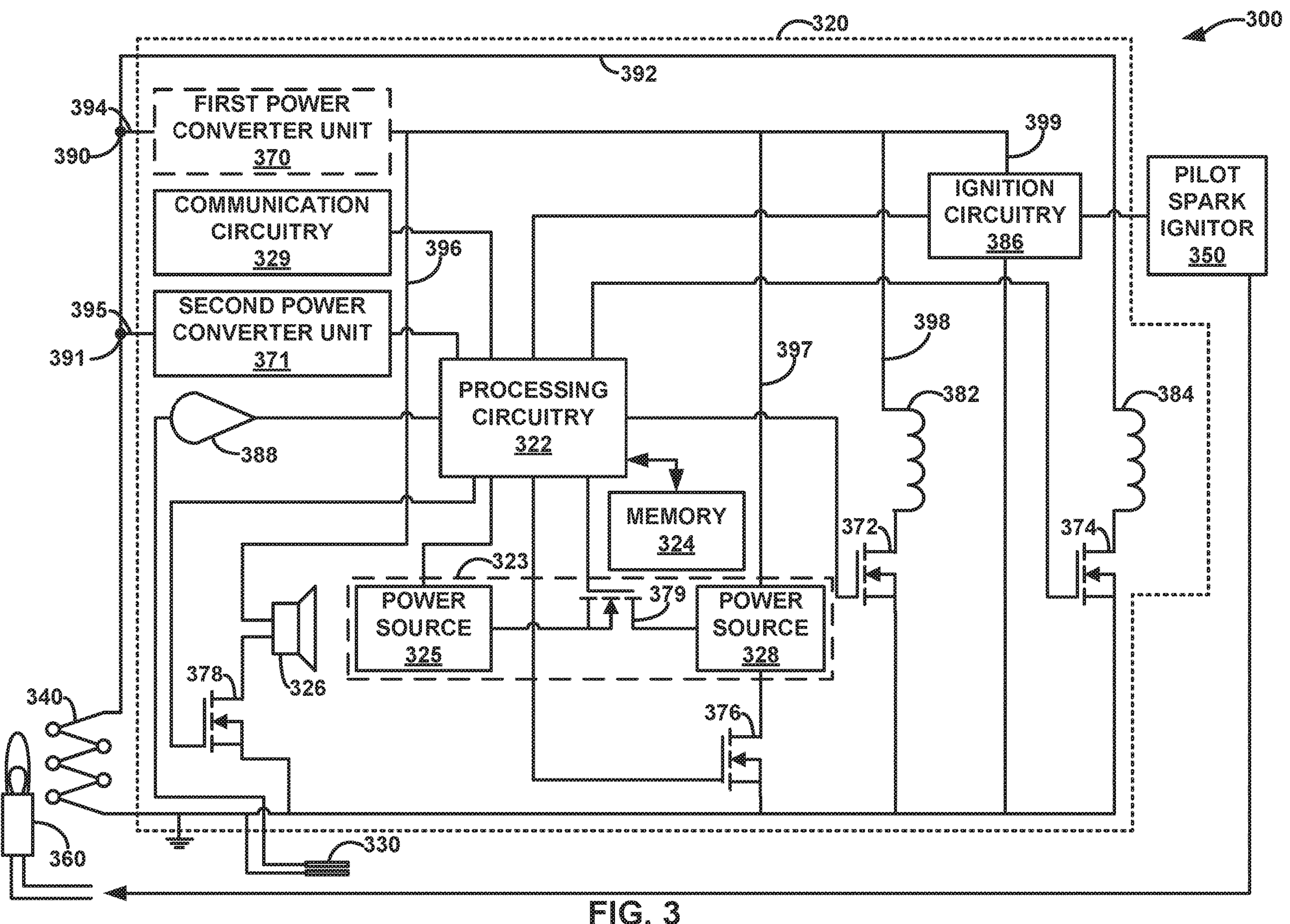
FIG. 3 is a circuit diagram illustrating a water heater control system, in accordance with one or more techniques of this disclosure.

FIG. 3 is a circuit diagram illustrating a water heater control system 300, in accordance with one or more techniques of this disclosure. As illustrated in FIG. 3, system 300 includes circuit 320, leak sensor 330, thermoelectric device 340, pilot spark ignitor 350, and intermittent pilot light 360.

Circuit 320 includes processing circuitry 322, memory 324, power source 325, alarm device 326, power source 328, communication circuitry 329, first power converter unit 370, second power converter unit 371, first switching device 372, second switching device 374, third switching device 376, fourth switching device 378, fifth switching device 379, pilot valve operator 382, main valve operator 384, ignition circuitry 386, and amplifier 388. Circuit 320 may be an example of circuit 120 of FIG. 1. Processing circuitry 322 may be an example of processing circuitry 122 of FIG. 1. Memory 324 may be an example of memory 124 of FIG. 1. Alarm device 326 may be an example of alarm device 126 of FIG. 1. Power source 328 may be an example of power source(s) 128 of FIG. 1. Communication circuitry 329 may be an example of communication circuitry 129 of FIG. 1. Thermoelectric device 340 may be an example of thermoelectric device 140 of FIG. 1. Intermittent pilot light 360 may be an example of intermittent pilot light 160 of FIG. 1. Pilot spark ignitor 350 may be an example of pilot spark ignitor 150 of FIG. 1. System 300 may be configured to perform one or more techniques described with respect to system 100 and system 200 of FIG. 1 and FIG. 2, respectively. In some examples, a power system 323 includes power source 325, power source 328, and fifth switching device 379.

First switching device 372, second switching device 374, third switching device 376, fourth switching device 378, and fifth switching device 379 (collectively, "switching devices 372, 374, 376, 378, 379") may allow processing circuitry 322 control a temperature of water inside of a water heater device (e.g., water tank 210 of FIG. 2) and activate alarm device 326 in response to receiving an electrical signal from leak sensor 330 indicative of a leak in the water heater device. Each of switching devices 372, 374, 376, 378, 379 may, in some cases, include power switches such as, but not limited to, any type of field-effect transistor (FET) including any combination of metal-oxide-semiconductor field-effect transistors (MOSFETs), bipolar junction transistors (BJTs), insulated-gate bipolar transistors (IGBTs), junction field effect transistors (JFETs), high electron mobility transistors (HEMTs), or other elements that use voltage for control. Additionally, switching devices 372, 374, 376, 378, 379 may include n-type transistors, p-type transistors, and power transistors, or any combination thereof. In some examples, switching devices 372, 374, 376, 378, 379 include vertical transistors, lateral transistors, and/or horizontal transistors. In some examples, switching devices 372, 374, 376, 378, 379 include other analog devices such as diodes and/or thyristors. In some examples, switching devices 372, 374, 376, 378, 379 may operate as switches and/or as analog devices.

In some examples, each of switching devices 372, 374, 376, 378, 379 include three terminals: two load terminals and a control terminal. For MOSFET switches, each of switching devices 372, 374, 376, 378, 379 may include a drain terminal, a source terminal, and at least one gate terminal, where the control terminal is a gate terminal. For BJT switches, the control terminal may be a base terminal. Current may flow between the two load terminals of each of switching devices 372, 374, 376, 378, 379, based on the voltage at the respective control terminal. Therefore, electrical current may flow across switching devices 372, 374, 376, 378, 379 based on control signals delivered to the respective control terminals of switching devices 372, 374, 376, 378, 379. In one example, if a voltage applied to the control terminals of switching devices 372, 374, 376, 378, 379 is greater than or equal to a voltage threshold, switching devices 372, 374, 376, 378, 379 may be activated, allowing switching devices 372, 374, 376, 378, 379 to conduct electricity. Furthermore, switching devices 372, 374, 376, 378, 379 may be deactivated when the voltage applied to the respective control terminals of switching devices 372, 374, 376, 378, 379 is below the threshold voltage, thus preventing switching devices 372, 374, 376, 378, 379 from conducting electricity. Processing circuitry 322 may be configured to independently control switching devices 372, 374, 376, 378, 379 such that one, combination, or none of switching devices 372, 374, 376, 378, 379 may be activated at a point in time.

Switching devices 372, 374, 376, 378, 379 may include various material compounds, such as Silicon, Silicon Carbide, Gallium Nitride, or any other combination of one or more semiconductor materials. In some examples, silicon carbide switches may experience lower switching power losses. Improvements in magnetics and faster switching, such as Gallium Nitride switches, may allow switching devices 372, 374, 376, 378, 379 to draw short bursts of current. These higher frequency switching devices may require control signals (e.g., voltage signals delivered by power processing circuitry 322 to respective control terminals of switching devices 372, 374, 376, 378, 379) to be sent with more precise timing, as compared to lower-frequency switching devices.

Processing circuitry 322 may be configured to receive an electrical signal from leak sensor 330 which indicates that a leak is present in a water heater device (e.g., water tank 210 of FIG. 2). Processing circuitry 322 may activate alarm device 326 in response to receiving the electrical signal from leak sensor 330, where alarm device 326 is powered for at least a period of time by power source 328. Processing circuitry 322 may apply a voltage to a control terminal of fourth switching device 378 in order to activate alarm device 326. Power source 328 may have a limited amount of stored energy. As such, if alarm device 326 remains in an activated state for a period of time drawing power from power source 328, the energy stored by power source 328 may be depleted unless power source 328 is recharged. Processing circuitry 322 may be configured to maintain an amount of energy stored by power source 328 so that the amount of energy is sufficient for power source 328 to supply energy to alarm device 326, allowing alarm device 326 to continuously remain in an activated state for as long as necessary. In order to maintain the amount of energy stored by power source 328, processing circuitry 322 may perform one or more of the techniques described with respect to processing circuitry 122 of FIG. 1.

In some examples, although alarm device 326 is powered for at least a period of time by power source 328, processing circuitry 322 may be powered by power source 325 which is separate from power source 328. In some examples, power source 325 may be a non-rechargeable battery having a battery life that lasts as long as a life of the water heater device. In some examples, power source 325 may supply energy to power source 328 in order to charge power source 328. For example, processing circuitry 322 may activate fifth switching device 379, allowing an electrical current to flow from power source 325 to power source 328.

System 300 may provide advantages in water heater systems where main gas flows intended to sustain main burner operations are typically much greater than the smaller pilot gas flows which generate the pilot flame. System 300 may be utilized to guard against potentially large discharges of non-combusted fuel into enclosed spaces or other environments.

Circuit 320 may be configured to receive power from thermoelectric device 340. Thermoelectric device 340 is a component configured to convert thermal energy into electrical power. As illustrated, thermoelectric device 340 may provide power to main valve operator 384 through electrical line 392, provide power to first power converter unit 370 through electrical line 394, provide power to second power converter unit 371 through electrical line 395, or any combination thereof. In some examples, first power converter unit 370 may forward at least a portion of the generated power to alarm device 326 through electrical line 396, forward at least a portion of the generated power to power source 328 through electrical line 397, forward at least a portion of the generated power to pilot valve operator 382 through electrical line 398, forward at least a portion of the generated power to ignition circuitry 386 through electrical line 399, or any combination thereof. It is not required for circuit 320 to include first power converter unit 370. For example, thermoelectric device 340 may supply an appropriate amount of power (e.g., voltage and/or current) to circuit 320 such that first power converter unit 370 is not needed to adjust the voltage and/or the current supplied by thermoelectric device 340. In some examples, a diode is included in circuit 320 in place of first power converter unit 370, the diode preventing power source 320 from supplying power to main valve operator 384.

Power source 328 provides the capability to store some portion of the electrical power generated by thermoelectric device 340, and also provides for powering of pilot valve operator 382 when thermoelectric device 340 is not generating energy. For example, thermoelectric device 340 may be configured to be in thermal communication with a heat source intended to operate intermittently, such as intermittent pilot light 360, and power from thermoelectric device 340 to pilot valve operator 382 may not always be available. In such cases, power source 328 provides the power to electrical components of system 300. In some examples, second power converter unit 371 may forward at least a portion of the generated power to processing circuitry 322.

In some examples not illustrated in FIG. 3 second power converter unit 371 is not included and processing circuitry 322 draws power from power source 325 without receiving power from thermoelectric device 340. Additionally, in some examples not illustrated in FIG. 3, processing circuitry 322 may receive power from power source 328.

System 300 is configured to limit power flow from node 390 to power source 328 to a single direction, so that while power source 328 may receive power from thermoelectric device 340 through node 390, power flow cannot occur from power source 328 to any components where node 390 is in the electrical path, such as main valve operator 384. In some examples, first power converter unit 370 is a unidirectional device such as a unidirectional DC-DC-convertor which limits power flow from node 390 through electrical line 394 to a single direction. The unidirectional flow of power from node 390 results in an arrangement whereby, when thermoelectric device 340 is receiving thermal energy and generating power, thermoelectric device 340 may deliver power to processing circuitry 322, alarm device 326, power source 328, pilot valve operator 382, and main valve operator 384. However, when thermoelectric device 340 is not generating electrical power, power source 328 may deliver power to alarm device 326, pilot valve operator 382, and ignition circuitry 386, but not to main valve operator 384. System 300 is thereby configured such that main valve operator 384 can only receive power when thermoelectric device 340 is generating power, whereas pilot valve operator 382 may receive power from thermoelectric device 340 (when thermoelectric device 340 is generating) or power source 328 (when thermoelectric device 340 is not generating).

Using a unidirectional DC-DC convertor for first power converter unit 370 is one example way to ensure that power source 328 does not deliver power sufficient to activate main valve operator 384. However, the example techniques are not so limited and other techniques to ensure that power source 328 does not deliver sufficient power may be possible. For example, components such as diodes, switches, etc. may be used to ensure that power source 328 does not provide sufficient power to activate main valve operator 384. Also, the above approaches provide example manners in which to ensure that main valve operator 384 receives sufficient power only from thermoelectric device 340. However, these examples are not intended to be exhaustive, and system 300 may utilize any configuration which allows thermoelectric device 340 to provide sufficient activation power to main valve operator 384 while preventing power source 328 from providing the sufficient activation power.

System 300 may provide one or more advantages in an apparatus where a first gas flow sustains a first flame generating a heat flux, and some portion of the heat flux impinges on some portion of a second gas flow in order to generate a second flame. In such devices, it may be advantageous to ensure the first flame is operating before commencing the second gas flow, in order to avoid discharges of non-combusted fuel into enclosed spaces or other environments, or for other reasons. This may be particularly advantageous when the second gas flow is significantly larger than the first gas flow. For example, it may be advantageous in water heater systems where a smaller pilot gas flow sustains a pilot flame at a pilot burner, and the pilot flame is in thermal communication with a larger main gas flow to generate a flame at a main burner. In FIG. 3, main valve operator 384 only opens to allow gas flow to the main burner when electrical power (e.g., voltage and current) are received from thermoelectric device 340. Thermoelectric device 340 may only generate the electrical power in response to the pilot flame. Hence, main valve operator 384 may not open unless the pilot flame is available. For example, when the pilot flame is dormant, thermoelectric device 340 does not generate sufficient (or any) electrical power. Since there is little to no electric power from thermoelectric device 340, main valve operator 384 remains in a closed state and gas flow cannot be provided to the main burner.

System 300 may be utilized in an intermittent pilot light system to effectively ensure that a pilot flame is established prior to initiating main fuel flow to a main burner. Pilot valve operator 382 may be configured to actuate a pilot valve, and main valve operator 384 may be configured to actuate a main valve (e.g., main valve 214 of FIG. 2). Thermoelectric device 340 may be configured to be in thermal communication with a pilot flame sustained by intermittent pilot light 360, such that at least some portion of a heat flux generated by the pilot flame of intermittent pilot light 360 impinges on thermoelectric device 340. In other words, thermoelectric device 240 of FIG. 3 is an example thermoelectric device 240 of FIG. 2.

When main burner operation is called for in the intermittent pilot light system, pilot valve operator 382 is in a state such as de-energized where fuel flow through the pilot valve is secured (e.g., blocked), and the pilot flame is dormant. With the pilot flame dormant, thermoelectric device 340 is generating insufficient electrical power to cause valve operation through main valve operator 384. As previously discussed, system 300 is configured so that power source 328 may deliver power to pilot valve operator 382, but not to main valve operator 384 due to the configuration of, e.g., first power converter unit 370, or some other component or device in electrical communication with node 390. Main valve operator 384 can only receive power from thermoelectric device 340.

System 300 may initiate establishment of the dormant pilot flame by energizing pilot valve operator 382 using power source 328, initiating a pilot gas flow to a pilot burner such as intermittent pilot light 360. Similarly, system 300 may energize ignition circuitry 386 to cause pilot spark ignitor 350 to generate thermal energy. Similar to intermittent pilot light 260 and pilot spark ignitor 250 of FIG. 2, pilot spark ignitor 350 may be in thermal communication with the pilot gas flow such that the pilot flame ignites intermittent pilot light 360. Additionally, or alternatively, a hot surface ignitor (not illustrated in FIG. 3) may ignite intermittent pilot light 360. With thermoelectric device 340 is in thermal communication with the established pilot flame, thermoelectric device 340 generates electrical energy from the thermal energy of the pilot flame and provides this electrical energy to main valve operator 384. Main valve operator 384 actuates a main valve such as main valve 214 (FIG. 2), providing a main fuel flow through fuel line 268 (FIG. 2). The established pilot flame is in thermal communication with the main fuel flow and generates combustion of the main fuel flow.

Acting in this manner, system 300 may ensure that a pilot flame is established prior to initiating main fuel flow to a main burner. Ensuring that the pilot flame is established prior to initiating main fuel flow to the burner avoids situations leading to discharges of non-combusted main fuel into surrounding environments.

Further, while main burner operation is called for and the pilot flame remains established, system 300 may be configured to allow thermoelectric device 340 to provide power to pilot valve operator 382 through first power converter unit 370 and electrical line 398. System 300 may also be configured to allow thermoelectric device 340 to provide power to power source 328 through first power converter unit 370 and electrical line 397, replenishing the stored energy utilized to initially open the pilot valve, operate alarm device 326, operate ignition circuitry 386, or any combination thereof. In examples, system 300 may be configured to allow thermoelectric device 340 to provide power to one or more of processing circuitry 322, ignition circuitry 386, and pilot spark ignitor 350.

Additionally, system 300 may be configured such that thermoelectric device 340 is the sole source of power input for one or more of first power converter unit 370, processing circuitry 322, power source 328, pilot valve operator 382, main valve operator 384, ignition circuitry 386, and pilot spark ignitor 350. This configuration may be advantageous in a water heater system where an additional source of power is unavailable due to, for example, a water heater location removed from a line power source, or some other reason.

In examples, pilot valve operator 382 may operate a pilot servo valve. The pilot servo valve may be configured to control a pressure of a fluid acting on a fluid actuated valve operator, with the fluid valve operator isolating a fuel supply from the pilot burner. When the pilot servo valve acts to increase or decrease a pressure of the fluid, the fluid actuated valve operator may establish fluid communication between the fuel supply and the pilot burner, establishing the pilot gas flow. Similarly, in examples main valve operator 384 may operate a main servo valve. The main servo valve may be configured to control a pressure of a fluid acting on a second fluid actuated valve operator, with the second fluid valve operator isolating a fuel supply from the main burner. When the main servo valve acts to increase or decrease a pressure of the fluid, the fluid actuated valve operator may establish fluid communication between the fuel supply and the main burner, establishing a main gas flow.

In examples when a flame such as the pilot flame is in thermal communication with a gas flow, or a gas flow is in thermal communication with a flame, this means the flame generates a heat flux and the heat flux impinges on some portion of the gas flow. In examples, the heat flux of the flame is sufficient to generate combustion within the portion of the gas flow. In examples, when the pilot spark ignitor is in thermal communication with a gas flow, this means that when the pilot spark ignitor generates an igniting energy such as a heat flux or electrical discharge, and some portion of the igniting energy impinges on some portion of the gas flow. In examples, the igniting energy of the pilot spark ignitor is sufficient to generate combustion within the portion of the gas flow. In examples when thermoelectric device 340 is in thermal communication with a flame, the flame generates a heat flux and some portion of the heat flux impinges on some part of thermoelectric device 340. In examples, the heat flux of the flame is sufficient to cause thermoelectric device 340 to convert some portion of the heat flux into electrical energy. In examples, when a temperature sensing device is in thermal communication with a body of water, this means a change in the temperature of the body of water affects the operating behavior of the temperature sensing device.

As discussed, system 300 may include processing circuitry 322. Processing circuitry 322 in some examples, may include one or more processors that are configured to implement functionality and/or process instructions for execution within system 300. For example, processing circuitry 322 may be capable of processing instructions stored in a memory (e.g., memory 324). Processing circuitry 322 may include, for example, microprocessors, DSPs, ASICs, FPGAs, or equivalent discrete or integrated logic circuitry, or a combination of any of the foregoing devices or circuitry. Accordingly, processing circuitry 322 may include any suitable structure, whether in hardware, software, firmware, or any combination thereof, to perform the functions ascribed herein to processing circuitry 322.

Memory 324 may be configured to store information within system 300 during operation. Memory 324 may include a computer-readable storage medium or computer-readable storage device. In some examples, memory 324 includes one or more of a short-term memory or a long-term memory. Memory 324 may include, for example, RAM, DRAM, SRAM, magnetic discs, optical discs, flash memories, or forms of EPROM or EEPROM. In some examples, memory 324 is used to store program instructions for execution by processing circuitry 322. Memory 324 may be used by software or applications running on system 300 to temporarily store information during program execution.

In examples, processing circuitry 322 is configured to establish electrical contact between power source 328 and pilot valve operator 382. In an example, a first switching device 372 is configured to establish electrical contact between power source 328 and pilot valve operator 382, and processing circuitry 322 is configured to utilize first switching device 372 to establish the electrical contact. In some examples, processing circuitry 322 is configured to terminate electrical contact between power source 328 and pilot valve operator 382. In an example, first switching device 372 may be likewise configured to terminate electrical contact between power source 328 and pilot valve operator 382, and processing circuitry 322 is configured to utilize first switching device 372 to terminate the electrical contact.

Processing circuitry 322 may be configured to establish electrical contact between thermoelectric device 340 and main valve operator 384. In an example, a second switching device 374 is configured to establish electrical contact between thermoelectric device 340 and main valve operator 384, and processing circuitry 322 is configured to utilize second switching device 374 to establish the electrical contact. In some examples, processing circuitry 322 is configured to terminate electrical contact between thermoelectric device 340 and main valve operator 384. In an example, second switching device 374 is likewise configured to terminate electrical contact between thermoelectric device 340 and main valve operator 384, and processing circuitry 322 is configured to utilize second switching device 374 to terminate the electrical contact.

In some examples, processing circuitry 322 is configured to establish electrical contact between first power converter unit 370 and power source 328. In an example, a third switching device 376 is configured to establish electrical contact between first power converter unit 370 and power source 328, and processing circuitry 322 is configured to utilize third switching device 376 to establish the electrical contact. Processing circuitry 322 may be configured to terminate electrical contact between first power converter unit 370 and power source 328. In an example, third switching device 376 is likewise configured to terminate electrical contact between first power converter unit 370 and power source 328, and processing circuitry 322 is configured to utilize third switching device 376 to terminate the electrical contact. In some examples, processing circuitry 322 may turn on third switching device 376 in order to charge one or more elements of power system 323 (e.g., charge power source 328).

In an example, processing circuitry 322 is configured establish electrical contact between power source 328 and pilot valve operator 382 and establish electrical contact between thermoelectric device 340 and main valve operator 384. In some examples, processing circuitry 322 uses first switching device 372 and third switching device 376 to establish the electrical contact between power source 328 and pilot valve operator 382. Processing circuitry 322 may use second switching device 374 to establish the electrical contact between thermoelectric device 340 and main valve operator 384. Processing circuitry 322 may be configured to prompt ignition circuitry 386 to cause pilot spark ignitor 350 to generate an igniting energy, such as an electrical discharge. In some examples, processing circuitry 322 may be in data communication with a temperature sensor such as temperature sensing device 216 (FIG. 2), and temperature sensing device 216 may be configured to transmit temperature data to processing circuitry 322.

In an example, processing circuitry 322 is similarly programmed to terminate electrical contact between power source 328 and pilot valve operator 382 and terminate electrical contact between thermoelectric device 340 and main valve operator 384. Processing circuitry 322 may be configured to alert ignition circuitry 386 to cease causing pilot spark ignitor 350 to generate igniting energy.

Figure 4:
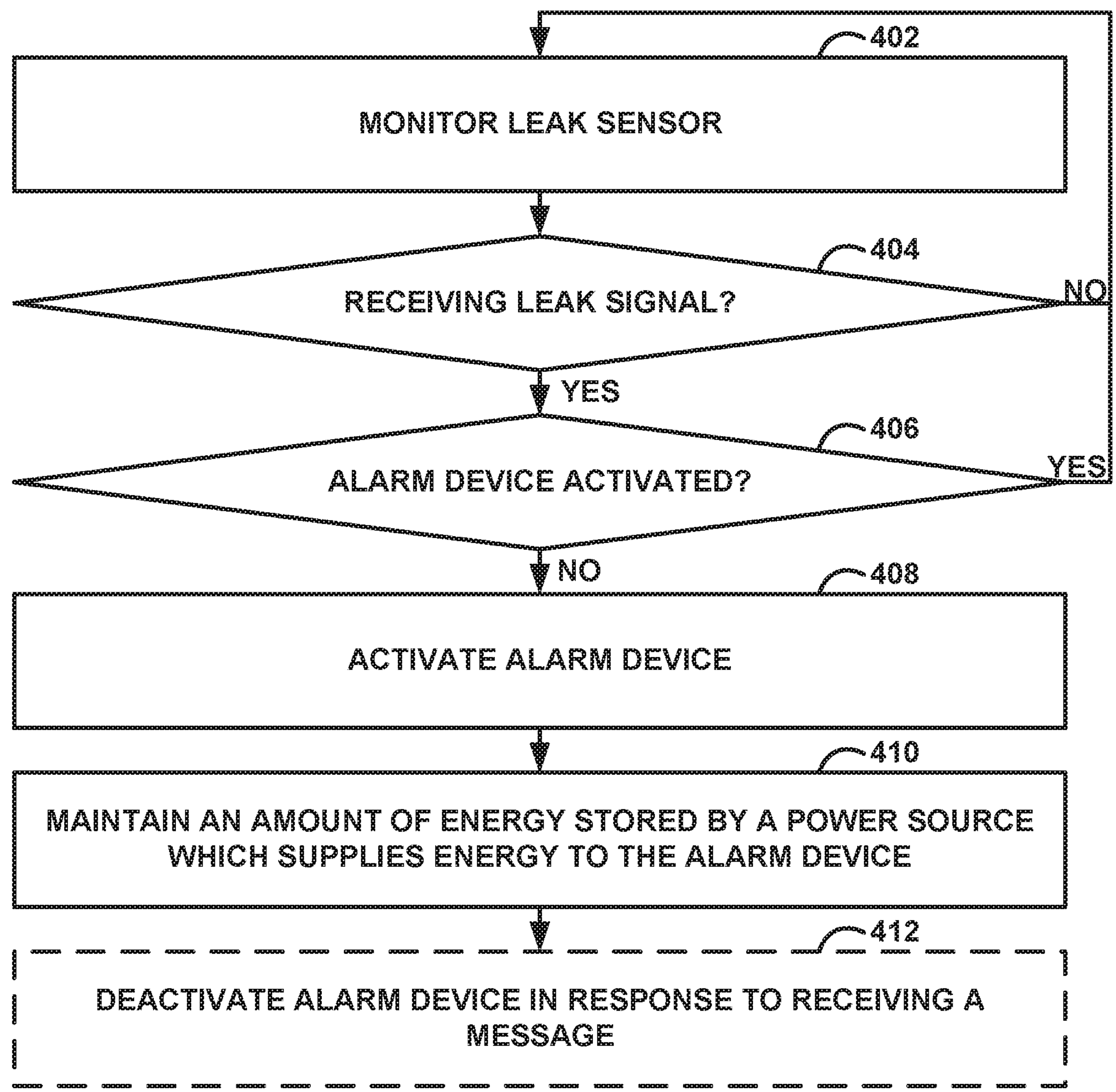
FIG. 4 is a flow diagram illustrating an example operation for activating an alarm, in accordance with one or more techniques of this disclosure. Like reference characters denote like elements throughout the description and figures.

FIG. 4 is a flow diagram illustrating an example operation for activating an alarm, in accordance with one or more techniques of this disclosure. For convenience, FIG. 4 is described with respect to system 100, system 200, and system 300 of FIGS. 1-3. However, the techniques of FIG. 4 may be performed by different components of system 100, system 200, and system 300 or by additional or alternative systems and devices.

In some examples, circuit 120 of water heater control system 100 activates an alarm (e.g., alarm device 126) after sensing a leak in a water heater device using leak sensor 130. For example, circuit 120 includes processing circuitry 122 which may monitor leak sensor 130 (402). In some examples, processing circuitry 122 monitors leak sensor 130 based on an electrical signal received from leak sensor 130. For example, processing circuitry 122 may determine whether processing circuitry 122 is receiving a leak signal (404) from leak sensor 130. In some examples, the "leak signal" is represented by an electrical signal that processing circuitry 122 may identify as being indicative of a leak in the water heater system. In some examples, leak sensor 130 does not output an electrical signal when a leak is not present in the water heater system. In some examples, leak sensor 130 outputs a first electrical signal when leak sensor 130 does not detect a leak in the water heater system and leak sensor outputs a second electrical signal when leak sensor 130 detects a leak in the water heater system. A magnitude of the second electrical signal may be different than a magnitude of first electrical signal, where processing circuitry 122 is configured to determine respective magnitudes of the first electrical signal and the second electrical signal. Based on the respective magnitudes, processing circuitry 122 may determine that the second electrical signal is the "leak signal." In some examples, processing circuitry 122 may determine that processing circuitry 122 is receiving a leak signal if a magnitude of an electrical signal emitted by leak sensor 130 is greater than a threshold magnitude value.

If processing circuitry 122 determines that processing circuitry 122 is not receiving a leak signal ("NO" branch of block 404), the example operation returns to block 202 and processing circuitry 122 monitors leak sensor 130. If processing circuitry 122 determines that processing circuitry 122 is receiving a leak signal ("YES" branch of block 404), processing circuitry 122 determines whether alarm device 126 is activated (406). In some examples, to determine whether alarm device 126 is activated, processing circuitry 122 determine whether processing circuitry 122 is activating a switching device (e.g., switching device 378 of FIG. 3) that controls an electric current through alarm device 126. If processing circuitry 122 determines that alarm device 126 is activated ("YES" branch of block 406), the example operation returns to block 402 and processing circuitry 122 monitors leak sensor 130. If processing circuitry 122 determines that alarm device 126 is not activated, processing circuitry 122 activates alarm device 126 (408). In order to activate alarm device 126, processing circuitry 122 may apply a voltage to a gate terminal of the switching device (e.g., switching device 378) which controls an electric current through alarm device 126. By applying the voltage to the gate terminal of the switching device, processing circuitry 122 may allow electric current to flow through alarm device 126, thus "activating" alarm device 126. In some examples, alarm device 126 emits a continuous audio signal when alarm device 126 is activated. In some examples, alarm device 126 emits a periodically repeating pattern of audio signals when alarm device 126 is activated. Additionally, or alternatively, in some examples, alarm device 126 emits other types of signals when alarm device 126 is activated including optical signals, electrical signals, mechanical signals, or any combination thereof.

Processing circuitry 122 maintains an amount of energy stored by power source(s) 128, which supplies energy to alarm device 126 (410). For example, when alarm device 126 is activated, power source(s) 128 supplies power to alarm device 126, thus decreasing an amount of energy stored by power source(s) 128. Unless power source(s) 128 is recharged, alarm device 126 may deplete the energy stored by power source(s) 128 such that power source(s) 128 is no longer able to cause alarm device 126 to emit an alarm signal (e.g., a noise). One or more techniques of this disclosure may allow processing circuitry 122 to maintain the amount of energy stored by power source(s) 128. For example, processing circuitry 122 may ignite intermittent pilot light 160 which in turn causes thermoelectric device 140 to generate an electrical signal that charges power source(s) 128 and/or supplies energy to alarm device 126. In some examples, processing circuitry 122 may deactivate alarm device 126 in response to receiving a message (412) instructing processing circuitry 122 to deactivate alarm device 126. The message, in some cases, may be received via communication circuitry 129.

Figure 5:
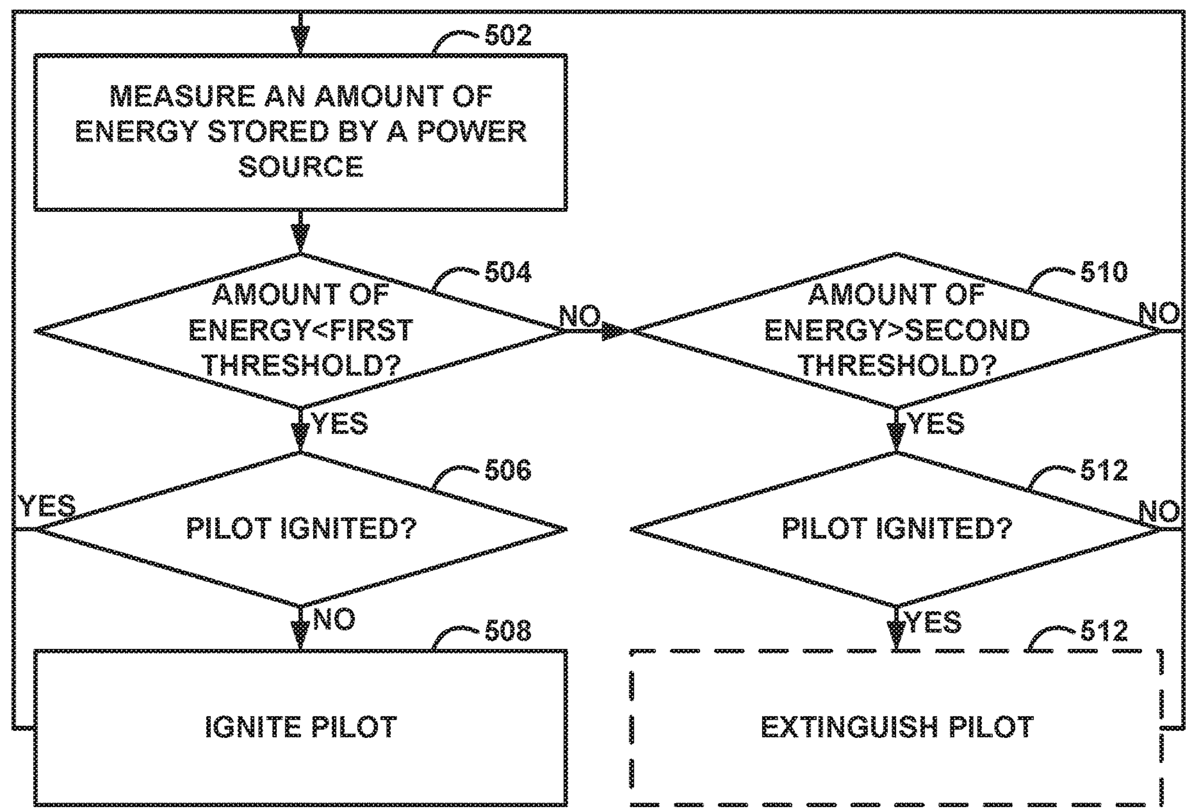
FIG. 5 is a flow diagram illustrating an example operation for charging a power source using an intermittent pilot light, in accordance with one or more techniques of this disclosure.

FIG. 5 is a flow diagram illustrating an example operation for charging power source(s) 128 using intermittent pilot light 160, in accordance with one or more techniques of this disclosure. For convenience, FIG. 5 is described with respect to system 100, system 200, and system 300 of FIGS. 1-3. However, the techniques of FIG. 5 may be performed by different components of system 100, system 200, and system 300 or by additional or alternative systems and devices. The example operation of FIG. 5 may, in some cases, represent an example operation of block 410 of FIG. 4 (e.g., "maintain an amount of energy stored by power source(s) 128 which supplies energy to alarm device 126").

In the example operation of FIG. 5, processing circuitry 122 measures an amount of energy stored by power source(s) 128 (502). In some examples, to measure the amount of energy stored by power source(s) 128, power source(s) 128 may determine an amount of time that power source(s) 128 would be able to output a particular amount of power. For example, one kilowatt hour (kW·h) represents an output of one kilowatt of power for a period of one hour. Processing circuitry 122 determines whether the amount of energy stored by power source(s) 128 is less than a first threshold amount of energy (504). In some examples, the first threshold amount of energy represents a fraction of a maximum amount of energy that power source(s) 128 is configured to store. When processing circuitry 122 determines whether the amount of energy stored by power source(s) 128 is less than the first threshold amount of energy, processing circuitry 122 may determine whether it is beneficial to charge power source(s) 128 so that power source(s) 128 may provide a sufficient amount of power to alarm device 126 so that alarm device 126 may remain in a continuously activated state. If the amount of energy is less than the first threshold amount of energy ("YES" branch of block 504), processing circuitry 122 determines whether intermittent pilot light 160 is ignited (506). When intermittent pilot light 160 is ignited, thermoelectric device 140 generates electrical energy which charges power source(s) 128, increasing the amount of energy stored by power source(s) 128.

If intermittent pilot light 160 is ignited ("YES" branch of block 506), the example operation returns to block 502 and processing circuitry 122 measures an amount of energy stored by power source(s) 128. If intermittent pilot light 160 is not ignited ("NO" branch of block 506), processing circuitry 122 ignites intermittent pilot light 160 (508). In some examples, processing circuitry 122 may activate a switching device (e.g., first switching device 372 of FIG. 3), allowing current to flow through a pilot valve operator (e.g., pilot valve operator 382). Additionally, processing circuitry 122 outputs an electrical signal to ignition circuitry (e.g., ignition circuitry 386). In turn, the ignition circuitry may output an electrical signal to pilot spark ignitor 150. Pilot spark ignitor 150 may generate one or more sparks which ignite intermittent pilot light 160. Processing circuitry 122, in some examples, may be powered by power source 125 which is separate from power source(s) 128. Additionally, or alternatively, processing circuitry may be directly powered by thermopile 140 via a power converter (e.g., second power converter unit 371. After processing circuitry 122 ignites intermittent pilot light 160, the example operation returns to block 502.

If the amount of energy is not less than the first threshold amount of energy ("NO" branch of block 504), processing circuitry 122 may determine whether the amount of energy stored by power source(s) 128 is greater than a second threshold amount of energy (510). In some examples, the second threshold amount of energy is equal to the first threshold amount of energy. In some examples, the second threshold amount of energy is greater than the first threshold amount of energy and the second threshold amount of energy represents a fraction of a maximum amount of energy that power source(s) 128 is configured to store. In some examples, the second threshold amount of energy is substantially the maximum amount of energy that power source(s) 128 is configured to store. By determining whether the amount of energy stored by power source(s) 128 is greater than the second threshold amount of energy, processing circuitry 122 may determine whether power source(s) 128 is storing enough energy for intermittent pilot light 160 to be deactivated, or "extinguished," such that thermoelectric device 140 does not generate an electrical signal. If processing circuitry 122 determines that the amount of energy stored by power source(s) 128 is not greater than the second threshold amount of energy ("NO" branch of block 510), the example operation returns to block 502 and processing circuitry 122 measures an amount of energy stored by power source(s) 128. If processing circuitry 122 determines that the amount of energy stored by power source(s) 128 is greater than the second threshold amount of energy ("YES" branch of block 510), processing circuitry 122 may determine whether intermittent pilot light 160 is ignited (512).

If processing circuitry 122 determines that intermittent pilot light 160 is not ignited ("NO" branch of block 512), the example operation returns to block 502 and processing circuitry 122 measures an amount of energy stored by power source(s) 128. If processing circuitry 122 determines that intermittent pilot light 160 is ignited ("YES" branch of block 512), processing circuitry 122 may, in some cases, extinguish intermittent pilot light 160 (512). However, in other cases, processing circuitry 122 may allow intermittent pilot light 160 to extinguish by itself or allow intermittent pilot light 160 to remain ignited. In any case, the example operation returns to block 502 and processing circuitry 122 measures an amount of energy stored by power source(s) 128.

Figure 6:
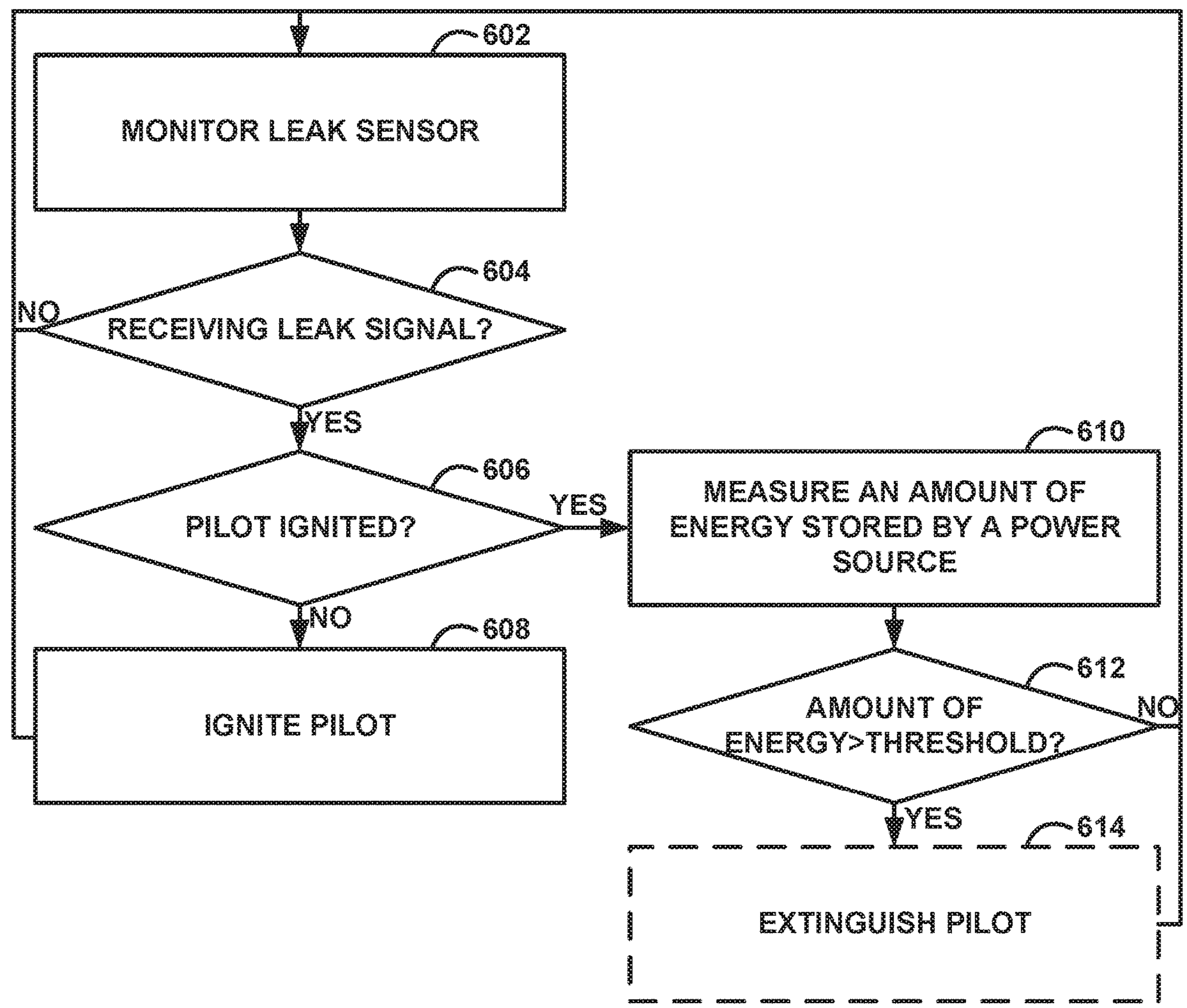
FIG. 6 is a flow diagram illustrating an example operation for charging one or more power sources of an energy storage system using an intermittent pilot light, in accordance with one or more techniques of this disclosure.

FIG. 6 is a flow diagram illustrating an example operation for charging one or more power sources of an energy storage system using intermittent pilot light 160, in accordance with one or more techniques of this disclosure. For convenience, FIG. 6 is described with respect to system 100, system 200, and system 300 of FIGS. 1-3. However, the techniques of FIG. 6 may be performed by different components of system 100, system 200, and system 300 or by additional or alternative systems and devices. The example operation of FIG. 6 may, in some cases, represent an example operation of block 410 of FIG. 4 (e.g., "maintain an amount of energy stored by power source(s) 128 which supplies energy to alarm device 126").

Processing circuitry 122 is configured to monitor leak sensor 130 (602). In some examples, processing circuitry 122 monitors leak sensor 130 based on an electrical signal received from leak sensor 130. For example, processing circuitry 122 may determine whether processing circuitry 122 is receiving a leak signal (604) from leak sensor 130. In some examples, the "leak signal" is represented by an electrical signal that processing circuitry 122 may identify as being indicative of a leak in the water heater system. In some examples, leak sensor 130 does not output an electrical signal when a leak is not present in the water heater system. In some examples, leak sensor 130 outputs a first electrical signal when leak sensor 130 does not detect a leak in the water heater system and leak sensor outputs a second electrical signal when leak sensor 130 detects a leak in the water heater system. A magnitude of the second electrical signal may be different than a magnitude of first electrical signal, where processing circuitry 122 is configured to determine respective magnitudes of the first electrical signal and the second electrical signal. Based on the respective magnitudes, processing circuitry 122 may determine that the second electrical signal is the "leak signal." In some examples, processing circuitry 122 may determine that processing circuitry 122 is receiving a leak signal if a magnitude of an electrical signal emitted by leak sensor 130 is greater than a threshold magnitude value.

If processing circuitry 122 determines that processing circuitry 122 is not receiving the leak signal ("NO" branch of block 604), the example operation returns to block 602 and processing circuitry 122 monitors leak sensor 130. If processing circuitry 122 determines that processing circuitry 122 is receiving the leak signal ("YES" branch of block 604), processing circuitry 122 determines whether intermittent pilot light 160 is ignited (606). When intermittent pilot light 160 is ignited, thermoelectric device 140 generates electrical energy which charges power source(s) 128, increasing the amount of energy stored by power source(s) 128. If intermittent pilot light 160 is ignited ("YES" branch of block 506), the example operation returns to block 602 and processing circuitry 122 monitors leak sensor 130. If intermittent pilot light 160 is not ignited ("NO" branch of block 606), processing circuitry 122 ignites intermittent pilot light 160 (608) and the example operation returns to block 602. If intermittent pilot light 160 is ignited ("YES" branch of block 606), processing circuitry 122 measures an amount of energy stored by power source(s) 128 (610). In some examples, to measure the amount of energy stored by power source(s) 128, power source(s) 128 may determine an amount of time that power source(s) 128 would be able to output a particular amount of power. For example, one kilowatt hour (kW·h) represents an output of one kilowatt of power for a period of one hour.

Processing circuitry determines if the amount of energy stored by power source(s) 128 is greater than a threshold amount of energy (612). By determining whether the amount of energy stored by power source(s) 128 is greater than the threshold amount of energy, processing circuitry 122 may determine whether power source(s) 128 is storing enough energy for intermittent pilot light 160 to be deactivated, or "extinguished," such that thermoelectric device 140 does not generate an electrical signal. If processing circuitry 122 determines that the amount of energy stored by power source(s) 128 is not greater than the threshold amount of energy ("NO" branch of block 612), the example operation returns to block 602 and processing circuitry 122 monitors leak sensor 130. If processing circuitry 122 determines that the amount of energy stored by power source(s) 128 is greater than the threshold amount of energy ("YES" branch of block 612), processing circuitry 122 may, in some cases, extinguish intermittent pilot light 160 (614). In some such cases, processing circuitry 122 may maintain intermittent pilot light 160 in a deactivated state for a predetermined period of time, even if processing circuitry 122 senses the leak signal.

In one or more examples, the systems described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some respects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. A water heater device comprising:

a leak sensor;

an intermittent pilot light; and a circuit comprising processing circuitry configured to:

receive, from the leak sensor, an electrical signal including information indicative of a leak in the water heater device;

activate, based on receiving the electrical signal, an alarm device, wherein the alarm device is configured to draw power for at least a period of time from a power source storing an amount of energy, wherein the power source is configured to receive energy from a thermoelectric device in proximity to the intermittent pilot light;

ignite, based on receiving the electrical signal, the intermittent pilot light, wherein igniting the intermittent pilot light causes an electrical current to flow from the thermoelectric device through the power source, thus increasing the amount of energy stored by the power source so that the amount of energy stored by the power source is sufficient for the power source to supply energy to the alarm device; and maintain the intermittent pilot light in a continuously ignited state when the processing circuitry receives the electrical signal.

2. The water heater device of claim 1, wherein to ignite the intermittent pilot light based on receiving the electrical signal and based on the alarm device drawing power from the power source, the processing circuitry is configured to:

monitor the amount of energy stored by the power source to determine if the amount of energy stored by the power source is greater than a threshold amount of energy; and ignite, based on the amount of energy stored by the power source falling below the threshold amount of energy, the intermittent pilot light, causing the thermoelectric device to supply the electrical current to the power source to increase the amount of energy stored by the power source.

3. The water heater device of claim 2, wherein the processing circuitry is further configured to maintain the intermittent pilot light in the continuously ignited state at least until the amount of energy stored by the power source rises above the threshold amount of energy.

4. The water heater device of claim 1, wherein to ignite the intermittent pilot light, the processing circuitry is configured to:

output an instruction to an ignition circuit to cause the ignition circuit to generate one or more sparks which ignite the intermittent pilot light.

5. The water heater device of claim 1, wherein the period of time is a first period of time, and wherein the alarm device is powered for at least a second period of time by the energy from the thermoelectric device.

6. The water heater device of claim 1, wherein the processing circuitry is further configured to:

output, via communication circuitry, a message including the information indicative of the leak in the water heater device to one or more remote devices, wherein the communication circuitry is configured to wirelessly communicate with the one or more remote devices.

7. The water heater device of claim 6, wherein the processing circuitry is further configured to:

receive, via the communication circuitry, a message including an instruction to ignore the information indicative of the leak in the water heater device;

deactivate, in response to receiving the message including the instruction to ignore the information indicative of the leak in the water heater device, the alarm device; and maintain the alarm device in a continuously deactivated state for at least a predetermined amount of time.

8. The water heater device of claim 1, wherein the communication circuitry comprises one or both of Wi-Fi® circuitry and a Bluetooth® radio, and wherein the communication circuitry is configured to communicate according to one or more Bluetooth® communication protocols and one or more Wi-Fi® protocols.

9. The water heater device of claim 1, wherein the processing circuitry is further configured to:

control a main burner to maintain a temperature of water in a water tank at a predetermined temperature value, wherein to control the main burner, the processing circuitry is configured to:

ignite, based on a water temperature model stored by a memory in communication with the processing circuitry, the pilot light in order to toggle the main burner between an activated state and a deactivated state.

10. A method for comprising:

receiving, by a circuit, an electrical signal from a leak sensor, the electrical signal including information indicative of a leak in a water heater device;

activating, by the circuit and based on receiving the electrical signal, an alarm device, wherein the alarm device is configured to draw power for at least a period of time from a power source storing an amount of energy, wherein the power source is configured to receive energy from a thermoelectric device in proximity to an intermittent pilot light;

igniting, by the circuit based on receiving the electrical signal, the intermittent pilot light, wherein igniting the intermittent pilot light causes an electrical current to flow from the thermoelectric device through the power source, thus increasing the amount of energy stored by the power source so that the amount of energy stored by the power source is sufficient for the power source to supply energy to the alarm device; and maintaining, by the circuit, the intermittent pilot light in a continuously ignited state when the processing circuitry receives the electrical signal.

11. The method of claim 10, wherein igniting the intermittent pilot light based on receiving the electrical signal comprises:

monitoring the amount of energy stored by the power source to determine if the amount of energy stored by the power source is greater than a threshold amount of energy; and igniting, based on the amount of energy stored by the power source falling below the threshold amount of energy, the intermittent pilot light, causing the thermoelectric device to supply the electrical current to the power source to increase the amount of energy stored by the power source.

12. The method of claim 11, wherein the method further comprises maintaining the intermittent pilot light in the continuously ignited state at least until the amount of energy stored by the power source rises above the threshold amount of energy.

13. The method of claim 10, wherein the period of time is a first period of time, and wherein the alarm device is powered for at least a second period of time by the energy from the thermoelectric device.

14. The method of claim 10, wherein method further comprises outputting, via communication circuitry, a message including the information indicative of the leak in the water heater device to one or more remote devices, wherein the communication circuitry is configured to wirelessly communicate with the one or more remote devices.

15. The method of claim 14, wherein the method further comprises:

receiving, via the communication circuitry, a message including an instruction to ignore the information indicative of the leak in the water heater device;

deactivating, in response to receiving the message including the instruction to ignore the information indicative of the leak in the water heater device, the alarm device; and maintaining the alarm device in a continuously deactivated state for at least a predetermined amount of time.

16. The method of claim 10, wherein method further comprises:

controlling a main burner to maintain a temperature of water in a water tank at a predetermined temperature value, wherein controlling the main burner comprises:

igniting, based on a water temperature model stored by a memory in communication with the processing circuitry, the pilot light in order to toggle the main burner between an activated state and a deactivated state.

* * * * *